(12) United States Patent
Kunimatsu et al.

(10) Patent No.: US 11,808,313 B2
(45) Date of Patent: Nov. 7, 2023

(54) CAM CLUTCH

(71) Applicant: TSUBAKIMOTO CHAIN CO., Osaka (JP)

(72) Inventors: Kohei Kunimatsu, Osaka (JP); Eiichi Nakagawa, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 119 days.

(21) Appl. No.: 17/520,434

(22) Filed: Nov. 5, 2021

(65) Prior Publication Data
US 2022/0056965 A1 Feb. 24, 2022

Related U.S. Application Data

(63) Continuation of application No. PCT/JP2020/018667, filed on May 8, 2020.

(30) Foreign Application Priority Data

May 20, 2019 (JP) ................................. 2019-094347

(51) Int. Cl.
*F16D 41/08* (2006.01)
*F16D 41/07* (2006.01)
*F16D 41/069* (2006.01)

(52) U.S. Cl.
CPC ......... *F16D 41/084* (2013.01); *F16D 41/069* (2013.01); *F16D 41/07* (2013.01); *F16D 41/08* (2013.01)

(58) Field of Classification Search
CPC ...... F16D 41/069; F16D 41/07; F16D 41/073; F16D 41/08; F16D 41/084; F16D 41/10

(Continued)

(56) References Cited

U.S. PATENT DOCUMENTS 2,721,638 A * 10/1955 Palm ..................... F16D 41/084
192/45.1
2,973,072 A * 2/1961 Ferris ..................... F16D 41/07
192/45.1

(Continued)

FOREIGN PATENT DOCUMENTS

CN 110701210 A 1/2020
DE 102007015104 A1 10/2008
(Continued)

OTHER PUBLICATIONS

The Extended European Search Report dated Apr. 24, 2023, issued in counterpart European Application No. 20810038.8 (7 pages).
(Continued)

*Primary Examiner* — Richard M Lorence
(74) *Attorney, Agent, or Firm* — WHDA, LLP

(57) ABSTRACT

An object of the present invention is to provide a cam clutch capable of switching from one operating mode to another and offering improved stability of clutch operations and high responsiveness. The object is achieved by an operating mode switching means (180) having a cam attitude change part (185) being drivable independently of rotation of the inner race (110) and outer race (120). A load support point (Sp) is located radially between a load application point (Ap) of the cam attitude change part (185) on the cam (140) and a distal contact point (Ep) of the cam (140) on a raceway positioned on a radially distal side relative to the load application point (Ap). The radial distance (d1) between the load application point (Ap) and the load support point (Sp) is larger than the radial distance (d2) between the load support point (Sp) and the distal contact point (Ep).

5 Claims, 11 Drawing Sheets

(58) Field of Classification Search
USPC .................................. 192/41 A, 45.1, 47
See application file for complete search history.

(56) References Cited

U.S. PATENT DOCUMENTS

| | | | |
|---|---|---|---|
| 4,693,351 | A | 9/1987 | Adolfsson |
| 2012/0309576 | A1 | 12/2012 | Kato |
| 2013/0319811 | A1 | 12/2013 | Kato et al. |

FOREIGN PATENT DOCUMENTS

| | | | |
|---|---|---|---|
| JP | 62-52227 | A | 3/1987 |
| JP | 8-11567 | A | 1/1996 |
| JP | 8-42603 | A | 2/1996 |
| JP | 10-323257 | A | 12/1998 |
| JP | 11-182589 | A | 7/1999 |
| JP | 2008-75867 | A | 4/2008 |
| JP | 2011-220509 | A | 11/2011 |
| JP | 2011-231828 | A | 11/2011 |
| JP | 5618448 | B2 | 11/2014 |
| WO | 2008/154830 | A1 | 12/2008 |
| WO | 2012/026019 | A1 | 3/2012 |
| WO | 2012/026021 | A1 | 3/2012 |
| WO | 2012/152757 | A1 | 11/2012 |

OTHER PUBLICATIONS

Non-Final Office Action dated Mar. 16, 2023, issued in U.S. Appl. No. 17/516,910 (11 pages).
International Search Report dated Jul. 7, 2020, issued in counterpart International Application No. PCT/JP2020/018667. (2 pages).
Japanese Written Opinion of the International Searching Authority (Form PCT/ISA/237) dated Jul. 7, 2020, issued in counterpart International Application No. PCT/JP2020/018667. (3 pages).
Notice of Reasons for Refusal dated Mar. 24, 2020, issued in counterpart of Japanese Patent Application No. 2019-094347, with English Translation. (8 pages).
Notice of Reasons for Refusal dated Nov. 4, 2020, issued in counterpart of Japanese Patent Application No. 2019-094347, with English Translation. (4 pages).
Decision to Grant a Patent dated Apr. 6, 2021, issued in counterpart of Japanese Patent Application No. 2019-094347, with English Translation. (5 pages).
Non-Final Office Action dated Aug. 9, 2023, issued in U.S. Appl. No. 17/516,910 (9 pages).
Office Action dated Aug. 29, 2023, issued in JP application No. 2020-082515, with English translation (11 pages).

* cited by examiner

CAM CLUTCH

TECHNICAL FIELD

The present invention relates to a cam clutch configured to be switchable between a free state that allows relative rotation between an outer race and an inner race and a locked state that prohibits relative rotation between the outer race and the inner race.

BACKGROUND ART

As one type of clutch that controls transmission and interruption of a rotary force, switchable two-way clutches that can drive and freewheel in both forward and reverse directions are known.

Some types of two-way clutches are configured to switch between a locked state that prohibits relative rotation between the inner race and the outer race (transmits the rotary force) and a free state that allows relative rotation between the inner race and the outer race (interrupts the rotary force) by tilting cams or sprags (see, for example, Patent Literature 1 and Patent Literature 2).

Patent Literature 3 describes a clutch configured to be switchable among three operating modes, i.e., two-way free mode allowing rotation in both forward and reverse directions, one-way lock mode allowing rotation only in the forward direction, and one-way lock mode allowing rotation only in the reverse direction, by controlling a retainer that retains both first sprags and second sprags, which are biased by biasing means toward opposite directions in which they lock rotation.

CITATION LIST

Patent Literature

[Patent Literature 1] Japanese Patent Application Publication No. 2011-220509
[Patent Literature 2] Japanese Patent Application Publication No. H11-182589
[Patent Literature 3] Japanese Patent Application Publication No. 2011-231828

SUMMARY OF INVENTION

Technical Problem

The two-way clutch described in Patent Literature 1 switches the states of engagement and separation between an input-side rotary member and an output-side rotary member by means of sprags that are tilted in the same direction as the rotation direction of the input-side rotary member when the input-side rotary member is rotated relative to the output-side rotary member. This poses the problem of poor responsiveness due to the time lost when the rotation direction is switched. The two-way clutch described in Patent Literature 2 entails the same problem.

Another problem was that, while the plurality of cams are circumferentially equally spaced by the retainer, the cams are, in actuality, disposed movably within a certain range of angles in respective pockets of the retainer, so that there are variations in the position (attitude) of adjacent cams, and the operation timing of the cams varied easily.

The present invention solves these problems, with an aim to provide a cam clutch capable of switching from one operating mode to another and offering improved stability of clutch operations and high responsiveness.

Solution to Problem

The present invention solves the above problems by providing a cam clutch including: an inner race and an outer race that are coaxial and rotatable relative to each other; a plurality of cams circumferentially arranged at intervals between the inner race and the outer race; a biasing means biasing each of the plurality of cams so that each of the plurality of cams makes contact with the inner race and the outer race; and an operating mode switch means including a cam attitude change part that is drivable independently of rotation of the inner race and the outer race to forcibly tilt the cams, wherein a load support point is located radially between a load application point of the cam attitude change part on the cam and a distal contact point of the cam on a raceway that is one of the inner race and the outer race positioned on a radially distal side relative to the load application point, a radial distance between the load application point and the load support point being larger than a radial distance between the load support point and the distal contact point.

Advantageous Effects of Invention

According to the invention set forth in claim 1, the circumferential position of each of the plurality of cams is restricted and the positional relationship between adjacent cams and the attitude of the cams are kept consistent, and therefore behavioral variations of cams when the cam attitude change part is driven to tilt the cams can be avoided. Since the distance between the load application point and the load support point can be set sufficiently large, a larger moment acts on the cams when the cam attitude change part moves, meaning that the attitude of the cams can be changed with a smaller force and with less influence of production variations of components. The stability of clutch operations can thus be improved and high responsiveness can be achieved.

According to the invention set forth in claim 2, the circumferential position of the cams and the attitude of the cams can be restricted more reliably, so that the stability of clutch operations can be improved and high responsiveness can be achieved reliably.

According to the invention set forth in claim 3, the desired effects can be reliably achieved without an increase in the number of components and with a simple structure.

According to the invention set forth in claim 4, the first cam and the second cam rotate in different directions for making engagement, meaning that the attitudes of one or both of the first cam and second cam can be selectively changed, which makes possible the switching among four operating modes, i.e., the two-way free mode allowing rotation in both forward and reverse directions, one-way lock mode allowing rotation in either one of the forward and reverse directions, and the two-way lock mode prohibiting rotation in both forward and reverse directions.

The invention according to claim 5 allows for easy switching among the four operating modes described above.

DESCRIPTION OF EMBODIMENTS

Embodiments of the present invention are described with reference to FIG. 1 to FIG. 16. Note, however, the present invention is not limited to these embodiments.

Embodiment 1

Figure 1:
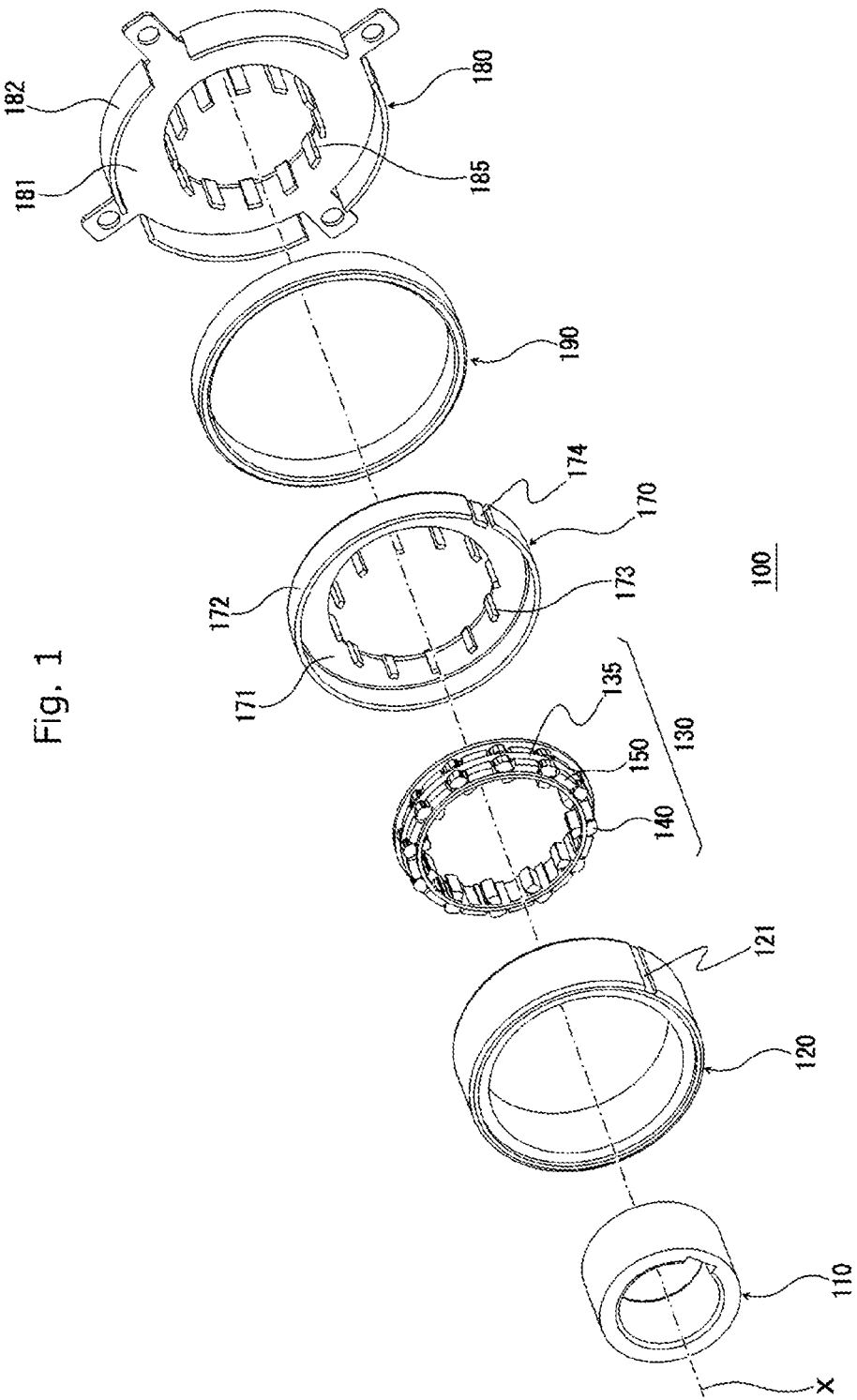
FIG. 1 is an exploded perspective view illustrating a configuration of one example of a cam clutch according to a first embodiment of the present invention.
Figure 2:
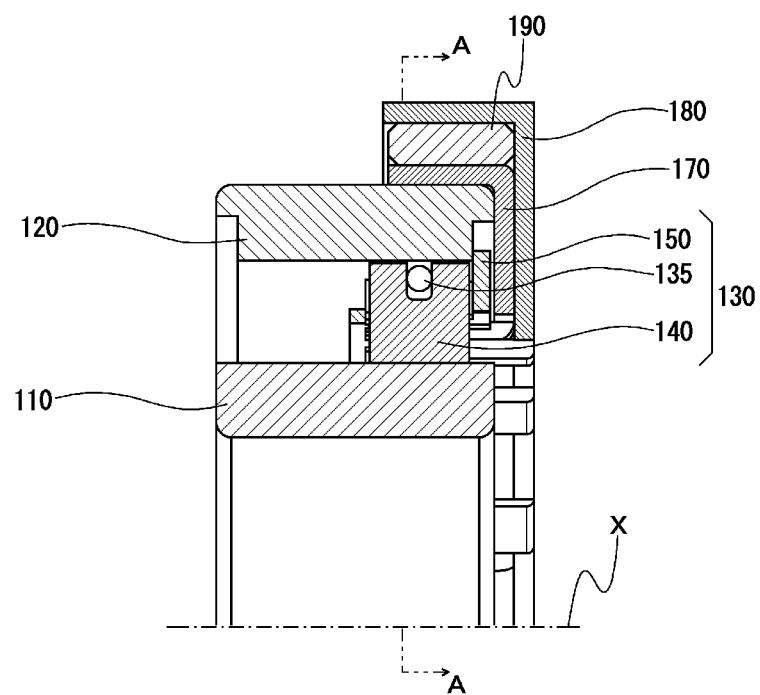
FIG. 2 is an enlarged cross-sectional view illustrating part of a cross section along the X axis of the cam clutch shown in FIG. 1.
Figure 3:
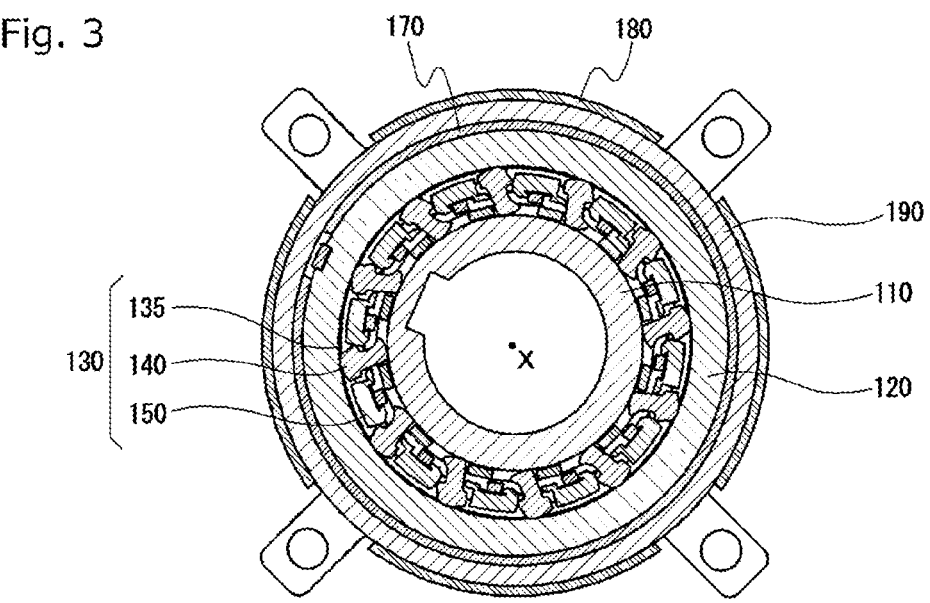
FIG. 3 is a cross-sectional view of the cam clutch shown in FIG. 1 cut along line A-A in FIG. 2.

The cam clutch 100 according to a first embodiment of the present invention includes an inner race 110 and an outer race 120 that are rotatable relative to each other on the same X axis, and a cam mechanism 130 that transmits and interrupts power between the inner race 110 and the outer race 120, as shown in FIG. 1 to FIG. 3.

The cam mechanism 130 is made up of a plurality of cams 140 arranged between the inner race 110 and the outer race 120, a cam cage 150 holding each of the plurality of cams 140 on the same circumference at predetermined circumferential intervals, and an annular garter spring 135 that is a biasing means that biases each of the plurality of cams 140 to make contact with the inner race 110 and the outer race 120.

Figure 4:
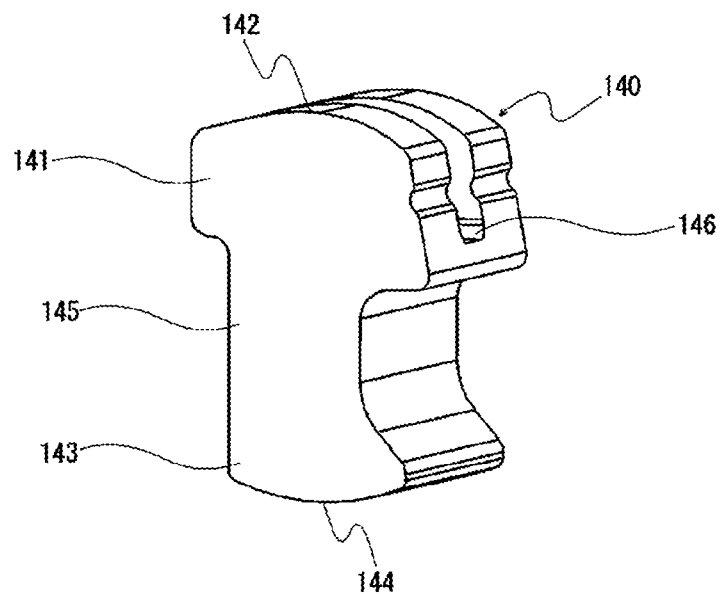
FIG. 4 is a perspective view illustrating a configuration of a cam in the cam clutch shown in FIG. 1.

The cam 140 includes, as shown in FIG. 4, a head part 141 having a circumferential surface formed in an arcuate curved shape protruding radially outward and constituting a radially outer engagement surface 142 making contact with the outer race 120, a leg part 143 having a circumferential surface formed in an arcuate curved shape protruding radially inward and constituting a radially inner engagement surface 144 making contact with the inner race 110, and a strut part 145 connecting the head part 141 and the leg part 143. The head part 141 extends out from the strut part 145 in the circumferential direction.

The radially outer engagement surface 142 of the cam 140 is formed with a garter spring mount groove 146 for receiving the garter spring 135 fitted therein, in a central part in a direction perpendicular to the end face of the cam 140 (X-axis direction). The garter spring mount groove 146 is designed to impart a clockwise (in FIG. 3) rotational moment to the cam 140 when it is biased by the garter spring 135 radially inward.

Figure 5:
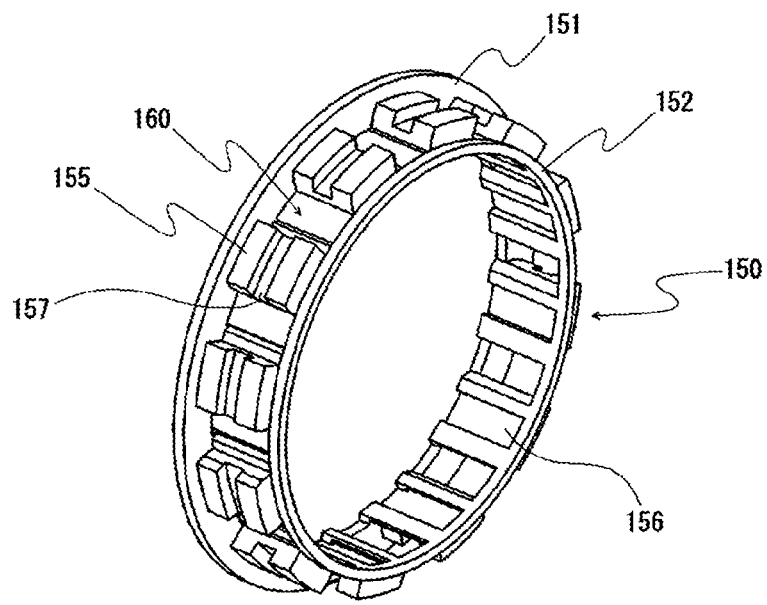
FIG. 5 is a perspective view illustrating a configuration of a cam cage in the cam clutch shown in FIG. 1.

The cam cage 150 has circumferentially equally spaced pockets 160 as shown in FIG. 5.

This cam cage 150 includes a pair of annular plates 151 and 152 axially opposite each other, and a plurality of columnar parts 155 axially extending at circumferentially equally spaced positions and connecting the annular plates 151 and 152, the spaces between adjacent columnar parts 155 forming the pockets 160. One annular plate 151 is designed to have larger outer dimensions than the other annular plate 152 so that it is placed in contact with the bottom surface of a recess formed in one end face of the outer race 120.

Each of the columnar parts 155 protrudes radially outward more than the outer peripheral edge of the other annular plate 152, and is formed with a circumferentially extending garter spring mount groove 157 in an outer circumferential surface thereof.

The cams 140 are inserted into the pockets 160 from the leg part 143 side such that the strut parts 145 are positioned inside the pockets 160, and with the garter spring 135 mounted, the cams are held on the cam cage 150. With the cams 140 held on the cam cage 150, a corner part on one side of the head part 141 of the cam 140 abuts on a side face on the other side of the columnar part 155. This restricts the circumferential position of the cam 140, as well as the attitude of the cam 140, so that all the cams 140 are brought in contact with the inner race 110 and outer race 120 without variations in their attitude (inclination).

This cam clutch 100 is provided with a cage rotation stopper 170 that is fixed to the outer race 120 and prohibits relative rotation of the cam cage 150 relative to the inner race 110 and outer race 120.

The cage rotation stopper 170 includes an annular plate part 171 that makes surface contact with one annular plate 151 of the cam cage 150 and restricts axial movements of the cam mechanism 130, a circumferential wall part 172 fitted over the outer race 120 and axially extending from an outer peripheral edge on one side of the annular plate part 171, and a plurality of stopper parts 173 axially extending at an inner peripheral edge of the annular plate part 171 to be inserted into grooves 156 formed in the corresponding columnar parts 155 of the cam cage 150. An engaging pawl 174 is formed on the circumferential wall part 172, to make sliding engagement with an axially extending recessed groove 121 formed on the outer circumferential surface of the outer race 120.

The cam clutch 100 according to this embodiment is provided with an operating mode switch means 180 for switching between a free state that allows relative rotation between the inner race 110 and outer race 120 and a locked state that prohibits relative rotation between the inner race 110 and outer race 120.

The operating mode switch means 180 of this embodiment includes an annular plate-like end wall part 181, a plurality of tab members 185 axially extending from an inner peripheral edge on one side of the end wall part 181 and functioning as a cam attitude change part, and a circumferential wall part 182 axially extending from an outer peripheral edge on one side of the end wall part 181. The operating mode switch means 180 is provided such that its circumferential wall part 182 is fitted over the circumferential wall part 172 of the cage rotation stopper 170 via a cylindrical bearing member 190, and the plurality of tab members 185 are located close to the outer circumferential surface of the inner race 110 between the leg parts 143 of adjacent cams 140.

Hereinafter, the operation of the cam clutch 100 according to the above first embodiment will be described.

The cam clutch 100 is in the one-way lock mode in which rotation of the outer race 120 relative to the inner race 110 in the forward direction (clockwise in FIG. 3) is prohibited when the tab members 185 constituting the cam attitude change part of this cam clutch 100 are at the neutral position, and can be switched from the one-way lock mode to the two-way free mode in which the outer race 120 is allowed to rotate relative to the inner race 110 in forward and reverse directions by operation of the operating mode switch means 180.

Figure 6:
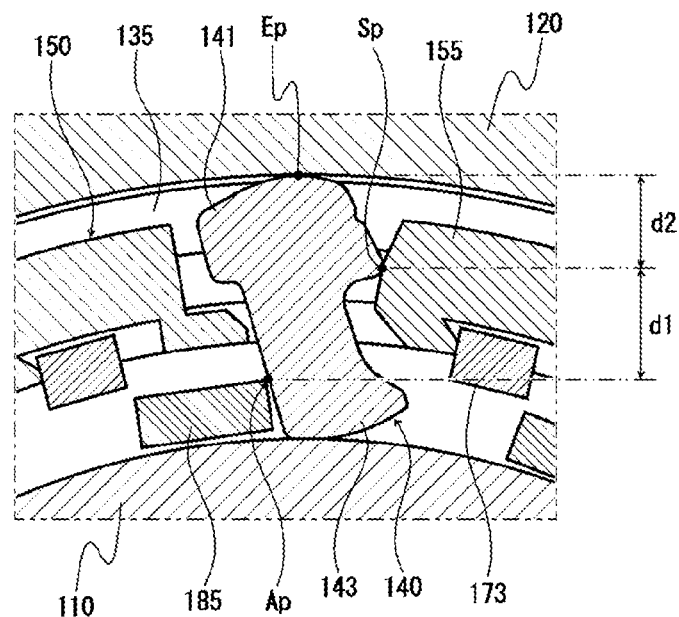
FIG. 6 is an illustrative operation diagram of the cam clutch shown in FIG. 1.

Namely, when the operating mode switch means 180 is rotated in the forward direction, each of the plurality of tab members 185 moves circumferentially in the forward direction relative to the cams 140, which causes the cams 140 to tilt around a load support point as the center of rotation in a direction in which they are disengaged from the inner race 110 and outer race 120. In this cam clutch 100, the head parts 141 of the cams 140 abut on the columnar parts 155 of the cam cage 150 such that, as shown in FIG. 6, the load support point Sp is located radially between a load application point Ap of the tab member 185 on the cam 140 and a distal contact point Ep between the cam and the outer race 120, or a contact point between the cam and a raceway positioned on the radially distal side relative to the load application point Ap on the cam 140. The radial distance d1 between the load application point Ap and the load support point Sp is larger than the radial distance d2 between the load support point Sp and the distal contact point Ep. Such a configuration allows the distance between the load application point Ap and the load support point Sp to be sufficiently large, and increases the moment that acts on the cams 140 when the tab members 185 move, meaning that the attitude of the cams 140 can be changed with a smaller force and with less influence of production variations of components. Since all the cams 140 are in contact with the inner race 110 and outer race 120 without variations in their attitude (inclination), behavioral variations of the cams 140 can be avoided. The stability of clutch operations can thus be improved and high responsiveness can be achieved.

Embodiment 2

Figure 7:
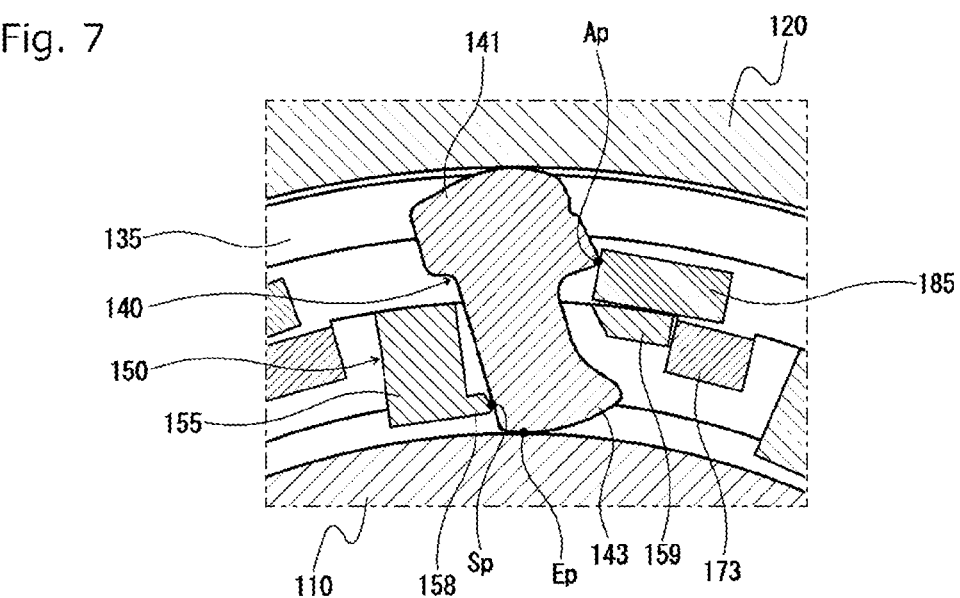
FIG. 7 is a lateral cross-sectional view perpendicular to the X axis illustrating part of the configuration of one example of the cam clutch according to a second embodiment of the present invention.

FIG. 7 is a lateral cross-sectional view perpendicular to the X axis illustrating part of the configuration of one example of the cam clutch according to a second embodiment of the present invention.

This cam clutch has a configuration similar to the cam clutch 100 according to the first embodiment except that the operating mode switch means 180 is designed to have the tab members 185 as the cam attitude change part positioned between the head parts 141 of adjacent cams 140, while the cam cage 150 abuts on the leg parts 143 of the cams 140 to form the load support points Sp.

Figure 8:
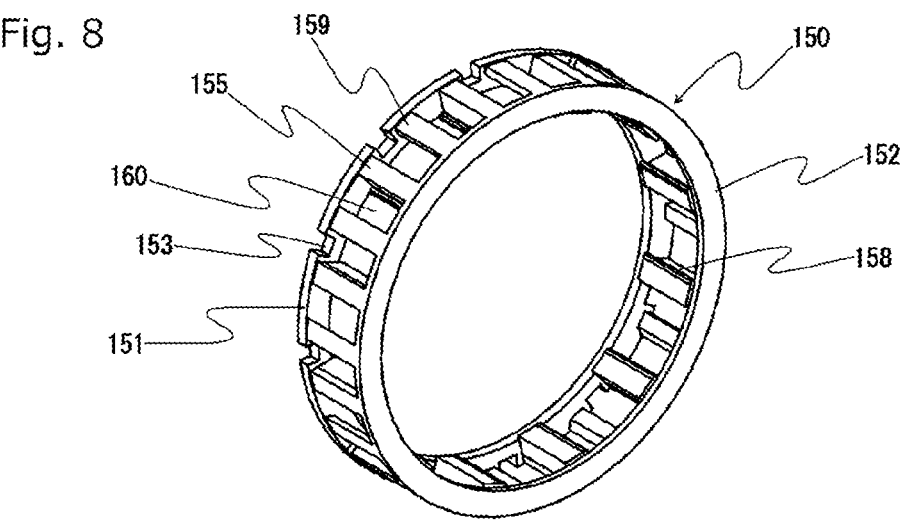
FIG. 8 is a perspective view illustrating a configuration of a cam cage in the cam clutch shown in FIG. 7.

The cam cage 150 includes, as shown in FIG. 8, a pair of annular plates 151 and 152 axially opposite each other, a plurality of columnar parts 155 axially extending at circumferentially equally spaced positions and connecting the annular plates 151 and 152, and a plurality of connecting plates 159 provided at the outer peripheral edge in the circumferential middle position between adjacent columnar parts 155 and connecting the annular plates 151 and 152. Each of the columnar parts 155 is provided, at one radially inner end thereof, with a protruded portion 158 protruding in one circumferential direction. The spaces between the columnar parts 155 and the connecting plates 159 positioned on the side where the columnar parts 155 have their protruded portions 158 form the pockets 160.

One annular plate 151 is formed with notches 153 that are in communication with the spaces formed between the pockets 160, for receiving the stopper parts 173 of the cage rotation stopper 170 inserted thereto.

In the cam clutch according to the above second embodiment, when the operating mode switch means 180 is rotated in the reverse direction (e.g., counterclockwise in FIG. 7), for example, each of the plurality of tab members 185 moves circumferentially in the reverse direction relative to the cams 140, which causes the cams 140 to tilt around the load support points Sp as the center of rotation in a direction in which they are disengaged from the inner race 110 and outer race 120. Since the distance between the load application point Ap and the load support point Sp is sufficiently large, the moment that acts on the cams 140 when the tab members 185 move is larger, meaning that the attitude of the cams 140 can be changed with a smaller force and with less influence of production variations of components. Since all the cams 140 are in contact with the inner race 110 and outer race 120 without variations in their attitude (inclination), behavioral variations of the cams 140 can be avoided. The stability of clutch operations can thus be improved and high responsiveness can be achieved.

In the cam clutch 100 according to the first embodiment, the cams are biased by the garter spring 135 and the corner part on one side of the head part 141 of the cam 140 abuts on the other side face of the columnar part 155, which restricts the circumferential position of the cam 140, as well as the attitude of the cam 140. In the cam clutch according to the second embodiment, the cams are biased by the garter spring 135 such that the leg parts 143 of the cams 140 on the other side abut on the protruded portions 158 of the columnar parts 155, to restrict the circumferential positions of the cams 140, as well as the attitude of the cams 140. Alternatively, a position restricting part that restricts the circumferential positions of the cams 140 and the attitude of the cams 140 may be separately provided.

Embodiment 3

Figure 9:
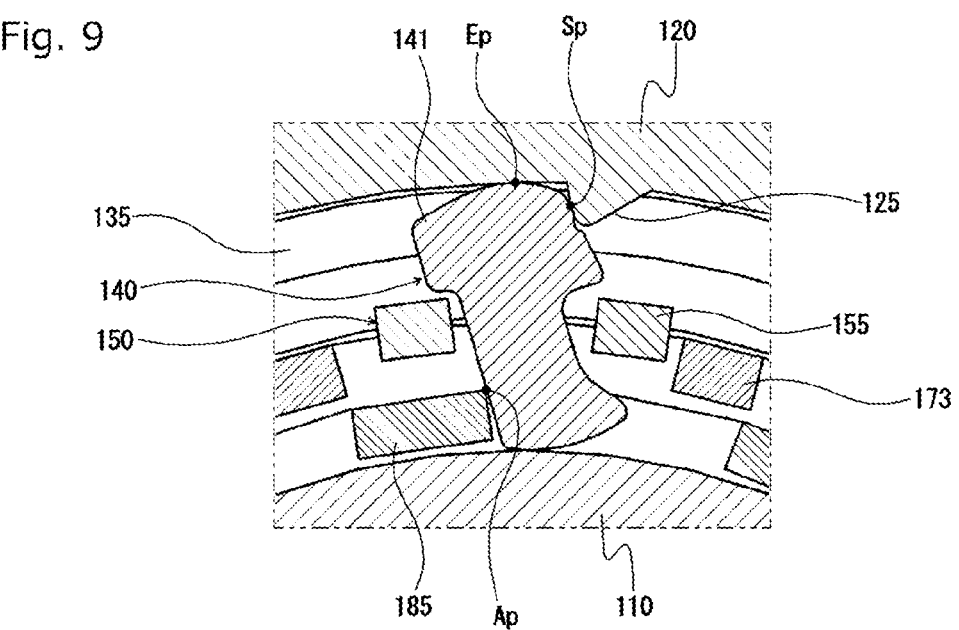
FIG. 9 is a lateral cross-sectional view perpendicular to the X axis illustrating part of the configuration of one example of the cam clutch according to a third embodiment of the present invention.

FIG. 9 is a lateral cross-sectional view perpendicular to the X axis illustrating part of the configuration of one example of the cam clutch according to a third embodiment of the present invention.

This cam clutch has a configuration similar to the cam clutch 100 according to the first embodiment except that position restricting parts 125 are provided on the inner circumferential surface of the outer race 120, which is the raceway positioned on the radially distal side relative to the tab members 185 that form the cam attitude change part.

The position restricting parts 125 are provided on the inner circumferential surface of the outer race 120 at circumferentially equally spaced positions such as to protrude radially inward. The position restricting parts need not be formed integrally with the outer race 120 and may be separately formed parts that are fixed to the outer race 120.

Figure 10:
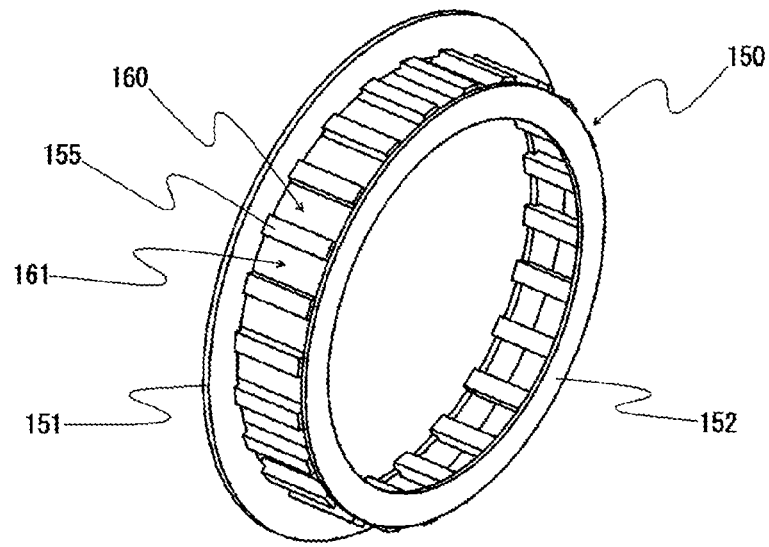
FIG. 10 is a perspective view illustrating a configuration of a cam cage in the cam clutch shown in FIG. 9.

The cam cage 150 includes, as shown in FIG. 10, a pair of annular plates 151 and 152 axially opposite each other, and a plurality of columnar parts 155 axially extending at circumferentially equally spaced positions and connecting the annular plates 151 and 152. One annular plate 151 is designed to have larger outer dimensions than the other annular plate 152 so that it is placed in contact with the bottom surface of a recess formed in one end face of the outer race 120. The columnar parts 155 are continuous with the inner edge of one annular plate 151 at one end, and continuous with the outer edge of the other annular plate 152 at the other end.

In this cam cage 150, the spaces between adjacent columnar parts 155 form, circumferentially alternately, pockets 160 in which the cams 140 are disposed and stopper accommodating parts 161 in which the stopper parts 173 of the cage rotation stopper 170 are positioned.

In this cam clutch, the cams 140 are biased by the garter spring 135 and one side face of the head parts 141 of the cams 140 abuts on the position restricting parts 125 such that the load support point Sp is located radially between a load application point Ap of the tab member 185 on the cam 140 and a distal contact point Ep between the cam and the outer race 120, or a contact point between the cam and a raceway positioned on the radially distal side relative to the load application point Ap on the cam 140. The load support point Sp is located at such a radial position that the radial distance between the load application point Ap and the load support point Sp is larger than the radial distance between the load support point Sp and the distal contact point Ep.

In this cam clutch, when the operating mode switch means 180 is rotated in the forward direction (e.g., clockwise in FIG. 9), each of the plurality of tab members 185 moves circumferentially in the forward direction relative to the cams 140, which causes the cams 140 to tilt around the load support points Sp as the center of rotation in a direction in which they are disengaged from the inner race 110 and outer race 120. Since the distance between the load application point Ap and the load support point Sp is sufficiently large, the moment that acts on the cams 140 when the tab members 185 move is larger, meaning that the attitude of the cams 140 can be changed with a smaller force and with less influence of production variations of components. Since the position restricting parts 125 keep all the cams 140 in contact with the inner race 110 and outer race 120 without variations in their attitude (inclination), behavioral variations of the cams 140 can be avoided. The stability of clutch operations can thus be improved and high responsiveness can be achieved.

In the case where the operating mode switch means 180 is designed to have the tab members 185 as the cam attitude change part positioned between the head parts 141 of adjacent cams 140, the position restricting parts may be formed on the outer circumferential surface of the inner race.

Embodiment 4

Figure 11:
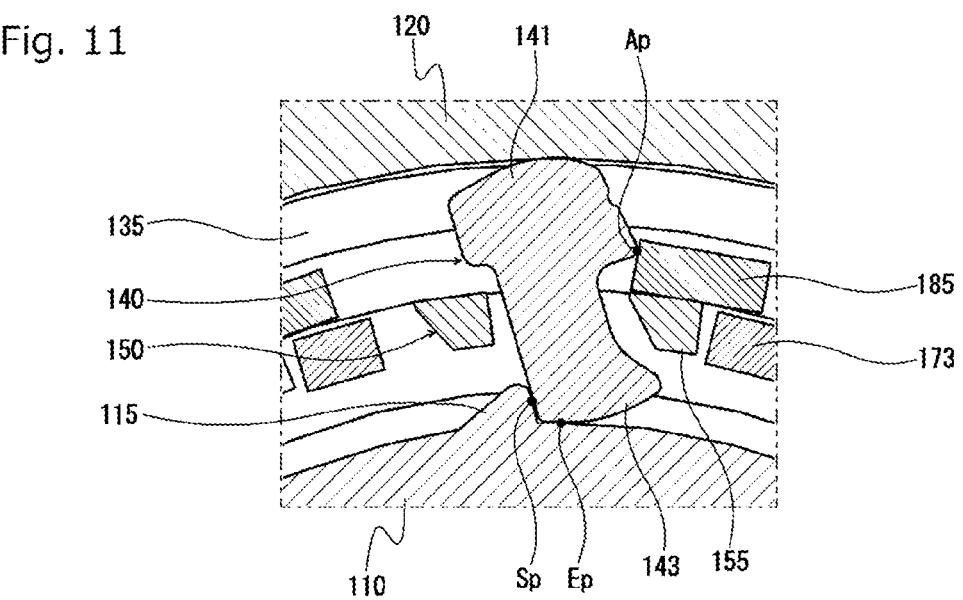
FIG. 11 is a lateral cross-sectional view perpendicular to the X axis illustrating part of the configuration of one example of the cam clutch according to a fourth embodiment of the present invention.

FIG. 11 is a lateral cross-sectional view perpendicular to the X axis illustrating part of the configuration of one example of the cam clutch according to a fourth embodiment of the present invention.

This cam clutch has a basic configuration similar to the cam clutch according to the second embodiment except that position restricting parts 115 are provided on the outer circumferential surface of the inner race 110, which is the raceway positioned on the radially distal side relative to the tab members 185 that form the cam attitude change part.

The position restricting parts 115 are provided on the outer circumferential surface of the inner race 110 at circumferentially equally spaced positions such as to protrude radially outward. The position restricting parts need not be formed integrally with the inner race 110 and may be separately formed parts that are fixed to the inner race 110.

Figure 12:
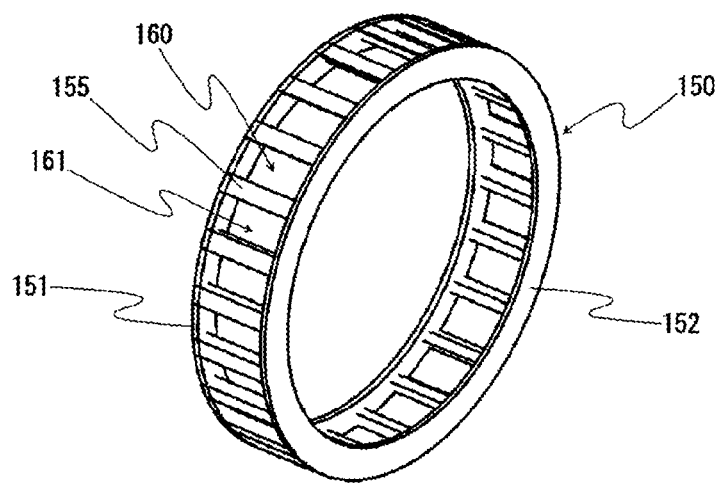
FIG. 12 is a perspective view illustrating a configuration of a cam cage in the cam clutch shown in FIG. 11.

The cam cage 150 includes, as shown in FIG. 12, a pair of annular plates 151 and 152 axially opposite each other, and a plurality of columnar parts 155 axially extending at circumferentially equally spaced positions and connecting the annular plates 151 and 152.

In this cam cage 150, the spaces between adjacent columnar parts 155 form, circumferentially alternately, pockets 160 in which the cams 140 are disposed and stopper accommodating parts 161 in which the stopper parts 173 of the cage rotation stopper 170 are positioned.

In this cam clutch, the cams 140 are biased by the garter spring 135 and the other side face of the leg parts 143 of the cams 140 abuts on the position restricting parts 115 such that the load support point Sp is located radially between a load application point Ap of the tab member 185 on the cam 140 and a distal contact point Ep between the cam and the inner race 110, or a contact point between the cam and a raceway positioned on the radially distal side relative to the load application point Ap on the cam 140. The load support point Sp is located at such a radial position that the radial distance between the load application point Ap and the load support point Sp is larger than the radial distance between the load support point Sp and the distal contact point Ep.

In this cam clutch, when the operating mode switch means 180 is rotated in the reverse direction (e.g., counterclockwise in FIG. 11), each of the plurality of tab members 185 moves circumferentially in the reverse direction relative to the cams 140, which causes the cams 140 to tilt around the load support points Sp as the center of rotation in a direction in which they are disengaged from the inner race 110 and outer race 120. Since the distance between the load application point Ap and the load support point Sp is sufficiently large, the moment that acts on the cams 140 when the tab members 185 move is larger, meaning that the attitude of the cams 140 can be changed with a smaller force and with less influence of production variations of components. Since the position restricting parts 115 act to keep all the cams 140 in contact with the inner race 110 and outer race 120 without variations in their attitude (inclination), behavioral variations of the cams 140 can be avoided. The stability of clutch operations can thus be improved and high responsiveness can be achieved.

While a garter spring is used as the biasing means to bias the cams radially inward in the configurations described above, the cam clutch of the present invention may be configured such that the cams are biased radially outward by a biasing means, or such that the cams are biased in a circumferential direction.

Embodiment 5

Figure 13:
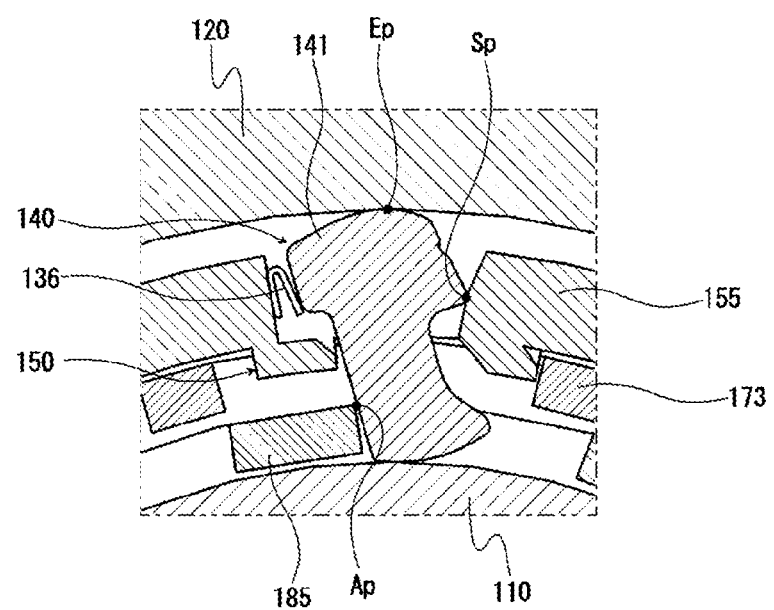
FIG. 13 is a lateral cross-sectional view perpendicular to the X axis illustrating part of the configuration of one example of the cam clutch according to a fifth embodiment of the present invention.

FIG. 13 is a lateral cross-sectional view perpendicular to the X axis illustrating part of the configuration of one example of the cam clutch according to a fifth embodiment of the present invention.

This cam clutch has a basic configuration similar to the cam clutch 100 according to the first embodiment except that plate springs 136 are used instead of the garter spring as the biasing means for biasing the cams 140 in a circumferential direction.

The plate springs 136 are each provided between one side face of the columnar parts 155 of the cam cage 150 and the other side face of the head parts 141 of the cams 140 so as to impart a clockwise (in FIG. 13) rotational moment to the cams 140 and also to function as position restricting means that restrict the circumferential positions of the cams 140 and the attitude of the cams 140.

In this cam clutch, the cams 140 are circumferentially biased by the plate springs 136 and a corner part of the head part 141 of the cam 140 on one side abuts on the other side face of the columnar part 155 such that the load support point Sp is located radially between a load application point Ap of the tab member 185 on the cam 140 and a distal contact point Ep between the cam and the outer race 120, or a contact point between the cam and a raceway positioned on the radially distal side relative to the load application point Ap on the cam 140. The load support point Sp is located at such a radial position that the radial distance between the load application point Ap and the load support point Sp is larger than the radial distance between the load support point Sp and the distal contact point Ep.

In this cam clutch, when the operating mode switch means 180 is rotated in the forward direction (clockwise in FIG. 13), each of the plurality of tab members 185 moves circumferentially in the forward direction relative to the cams 140, which causes the cams 140 to tilt around the load support points Sp as the center of rotation in a direction in which they are disengaged from the inner race 110 and outer race 120. Since the distance between the load application point Ap and the load support point Sp is sufficiently large, the moment that acts on the cams 140 when the tab members 185 move is larger, meaning that the attitude of the cams 140 can be changed with a smaller force and with less influence of production variations of components. Since the plate springs 136 as the position restricting means act to keep all the cams 140 in contact with the inner race 110 and outer race 120 without variations in their attitude (inclination), behavioral variations of the cams 140 can be avoided. The stability of clutch operations can thus be improved and high responsiveness can be achieved.

The cam clutch according to the above second embodiment, the cam clutch according to the above third embodiment, and the cam clutch according to the above fourth embodiment may also be configured to use plate springs as biasing means for biasing the cams 140 circumferentially instead of the garter spring.

Embodiment 6

Figure 14:
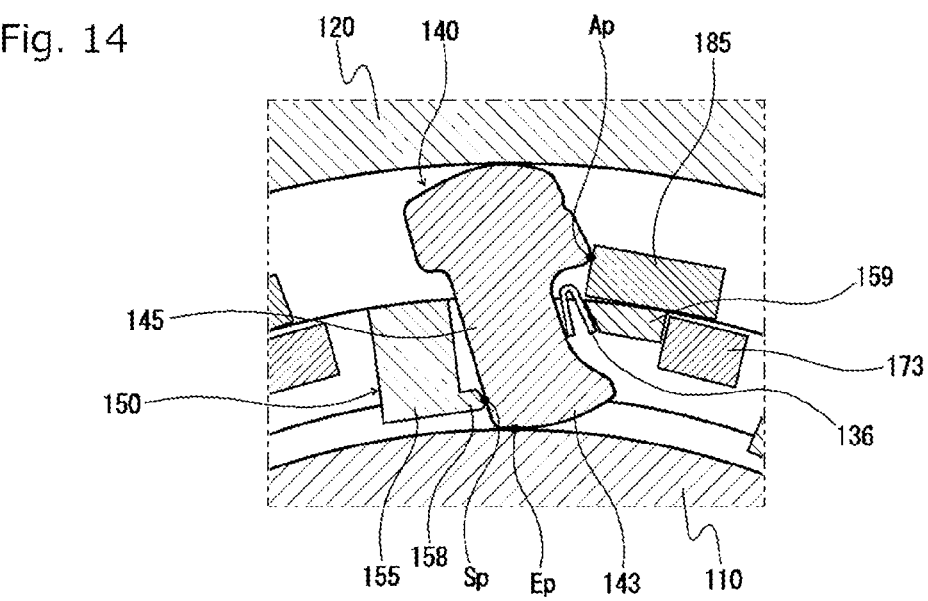
FIG. 14 is a lateral cross-sectional view perpendicular to the X axis illustrating part of the configuration of one example of the cam clutch according to a sixth embodiment of the present invention.

FIG. 14 is a lateral cross-sectional view perpendicular to the X axis illustrating part of the configuration of one example of the cam clutch according to a sixth embodiment of the present invention.

This cam clutch has a basic configuration similar to the cam clutch according to the above second embodiment except that plate springs are used instead of the garter spring as the biasing means for biasing the cams 140 in a circumferential direction.

The plate springs 136 are each provided inside the pockets of the cam cage 150 between one side face of the strut parts 145 of the cams 140 and the other side face of the connecting plates 159 so as to impart a clockwise (in FIG. 14) rotational moment to the cams 140 and also to function as position restricting means that cause the other side face of the leg parts 143 of the cams 140 to abut on the protruded portions 158 of the columnar parts 155 of the cam cage 150 for restricting the circumferential positions of the cams 140 and the attitude of the cams 140.

Embodiment 7

Figure 15:
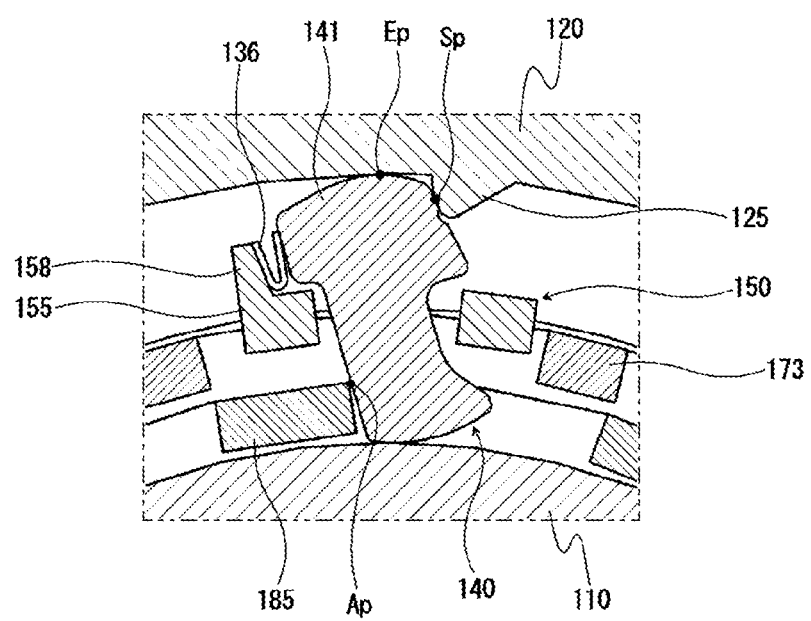
FIG. 15 is a lateral cross-sectional view perpendicular to the X axis illustrating part of the configuration of one example of the cam clutch according to a seventh embodiment of the present invention.

FIG. 15 is a lateral cross-sectional view perpendicular to the X axis illustrating part of the configuration of one example of the cam clutch according to a seventh embodiment of the present invention.

This cam clutch has a basic configuration similar to the cam clutch according to the above third embodiment except that plate springs are used instead of the garter spring as the biasing means for biasing the cams 140 in a circumferential direction, and that the cam cage has a different configuration.

The cam cage 150 has a configuration similar to the cam cage 150 of the cam clutch according to the third embodiment except that the columnar parts 155 positioned circumferentially on the other side of the pockets have a protruded portion 158 that is formed such as to protrude radially outward from an outer peripheral edge of the other annular plate.

The plate springs 136 are each provided between one side face of the protruded portions 158 of the columnar parts 155 of the cam cage 150 and the other side face of the head parts 141 of the cams 140 so as to impart a clockwise (in FIG. 15) rotational moment to the cams 140 and also to function as position restricting means that cause one side face of the head parts 141 of the cams 140 to abut on the position restricting parts 125 formed on the outer race 120 for restricting the circumferential positions of the cams 140 and the attitude of the cams 140.

Embodiment 8

Figure 16:
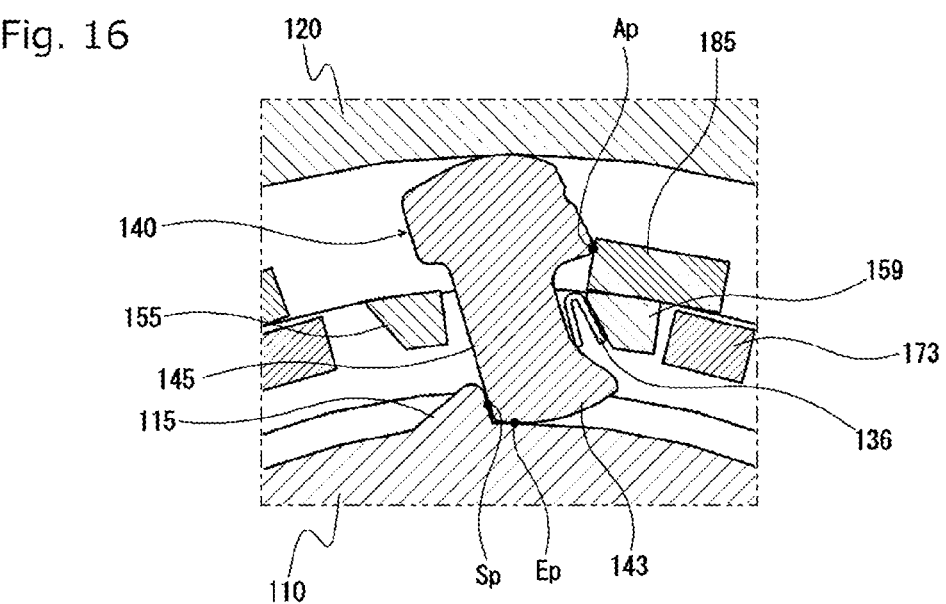
FIG. 16 is a lateral cross-sectional view perpendicular to the X axis illustrating part of the configuration of one example of the cam clutch according to an eighth embodiment of the present invention.
Figure 17:
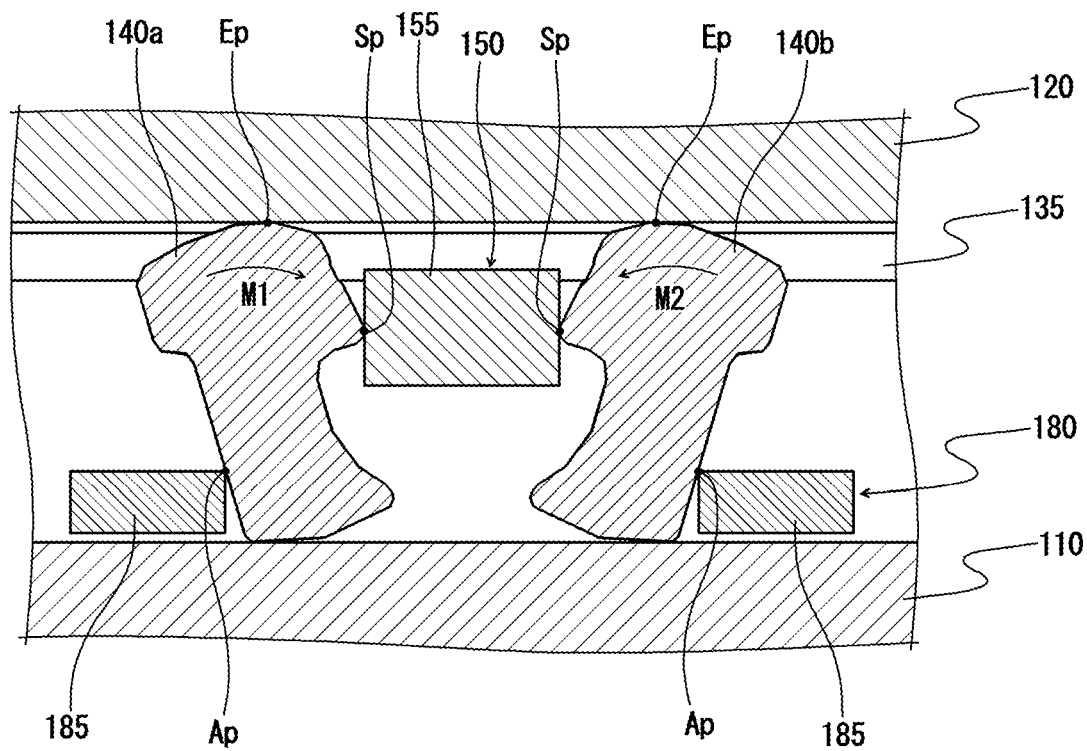
FIG. 17 is a lateral cross-sectional view perpendicular to the X axis illustrating part of the configuration of the cam clutch of another embodiment of the present invention.
Figure 18:
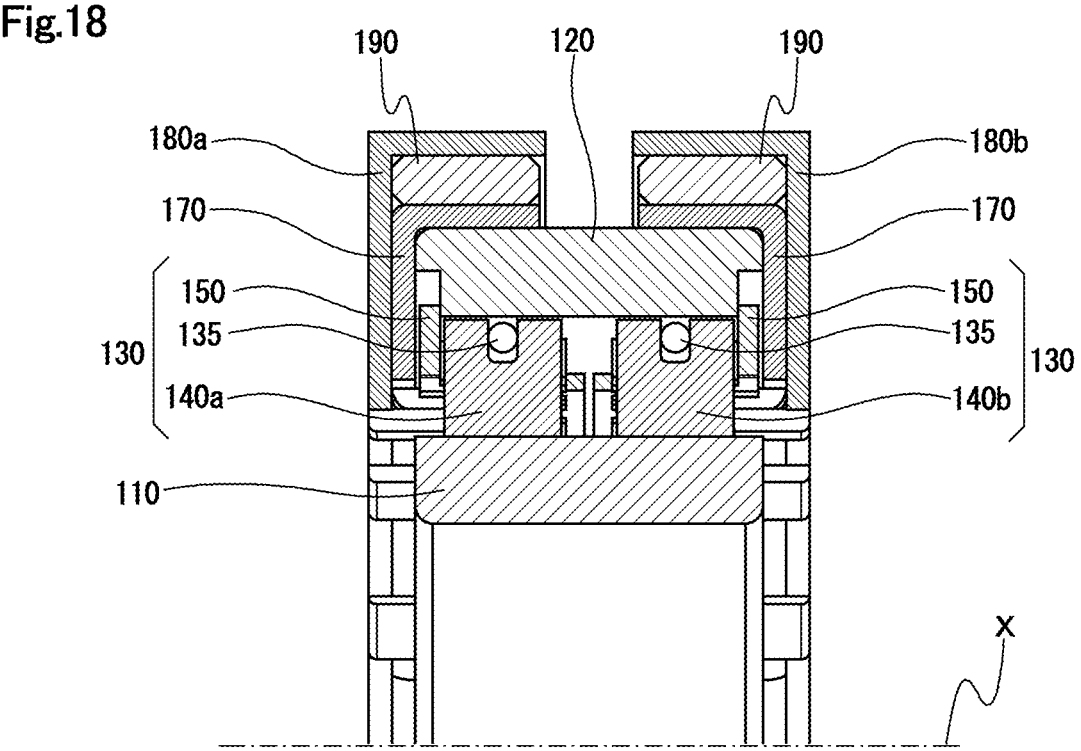
FIG. 18 is an enlarged cross-sectional view illustrating part of a cross section along the X axis of the cam clutch of another embodiment of the present invention.

FIG. 16 is a lateral cross-sectional view perpendicular to the X axis illustrating part of the configuration of one example of the cam clutch according to an eighth embodiment of the present invention.

This cam clutch has a basic configuration similar to the cam clutch according to the above fourth embodiment except that plate springs are used instead of the garter spring as the biasing means for biasing the cams 140 in a circumferential direction.

The plate springs 136 are each provided inside the pockets of the cam cage 150 between one side face of the strut parts 145 of the cams 140 and the other side face of the connecting plates 159 so as to impart a clockwise (in FIG. 16) rotational moment to the cams 140 and also to function as position restricting means that cause one side face of the leg parts 143 of the cams 140 to abut on the position restricting parts 115 formed on the inner race 110 for restricting the circumferential positions of the cams 140 and the attitude of the cams 140.

In the cam clutch according to the sixth embodiment and in the cam clutch according to the eighth embodiment, when the operating mode switch means 180 is rotated in the reverse direction, each of the plurality of tab members 185 moves circumferentially in the reverse direction relative to the cams 140, which causes the cams 140 to tilt around the load support points Sp as the center of rotation in a direction in which they are disengaged from the inner race 110 and outer race 120. In the cam clutch according to the seventh embodiment, when the operating mode switch means 180 is rotated in the forward direction, each of the plurality of tab members 185 moves circumferentially in the forward direction relative to the cams 140, which causes the cams 140 to tilt around the load support points Sp as the center of rotation in a direction in which they are disengaged from the inner race 110 and outer race 120.

Since the distance between the load application point Ap and the load support point Sp is sufficiently large, the moment that acts on the cams 140 when the tab members 185 move is larger, meaning that the attitude of the cams 140 can be changed with a smaller force and with less influence of production variations of components. Since the plate springs 136 as the position restricting means act to keep all the cams 140 in contact with the inner race 110 and outer race 120 without variations in their attitude (inclination), behavioral variations of the cams 140 can be avoided. The stability of clutch operations can thus be improved and high responsiveness can be achieved.

While embodiments of the present invention have been described above in detail, the present invention is not limited to the embodiments described above. Various design changes may be made without departing from the scope of the present invention set forth in the claims.

The above embodiments featured configurations in which the cams are biased by the biasing means to make contact with the inner race and outer race and tilted by the operating mode switch means to disengage from the inner race and outer race. Alternatively, the cams may be biased by the biasing means to separate from the inner race or outer race and tilted by the operating mode switch means to engage with the inner race and outer race.

The cams forming the cam mechanism may be designed to make frictional engagement with the inner race and outer race when rotated to either of the forward direction and reverse direction.

Moreover, while the operating mode switch means described in the above embodiments is configured to move the cam attitude change part circumferentially independently of rotation of the inner race and outer race, the operating mode switch means may be configured to move the cam attitude change part radially or axially independently of rotation of the inner race and outer race.

The cam cage and the cage rotation stopper may be integrally formed.

The above embodiments featured configurations provided with a cam mechanism with a plurality of identical cams circumferentially arranged on the same circumference and imparted with a rotational moment in the same direction by the biasing means. Alternatively, the cam mechanism may be designed to include a first cam 140a and a second 140b imparted with a rotational moment in different directions by the biasing means. In such a design, the first cam 140a would be configured to make frictional engagement with the inner race and outer race when the outer race rotates in one direction, for example, and be tilted in a direction in which it cancels the frictional engagement with the inner race and outer race when the outer race rotates in the other direction. The second cam 140b would be configured to make frictional engagement with the inner race and outer race when the outer race rotates in the other direction, for example, and be tilted in a direction in which it cancels the frictional engagement with the inner race and outer race when the outer race rotates in one direction.

The arrangement of the first cams and second cams is not limited to a particular layout. The first cams and second cams may be aligned on the same circumference, or a plurality of rows of a plurality of cams circumferentially aligned on the same circumference may be arranged side by side in the axial direction. In a configuration provided with a plurality of rows of cams, each row of cams may include only one of the first cam and second cam, or may include both of the first cam and second cam. The numbers of the first cams and second cams may be the same, or different.

In a case where the first cams and second cams are aligned on the same circumference, the first cams and second cams may be circumferentially alternately arranged, or the first and second cams may not be alternately arranged.

The operating mode switch means may be configured to be able to change the attitude of the first cam 140a and the attitude of the second cam 140b simultaneously, or to change the attitude of the first cam 140a and the attitude of the second cam 140b independently.

Alternatively, the attitudes of the first cam 140a and the second cam 140b may be changed by different operating mode switch means. In this case, for example, the operating mode switch means is provided on both sides in the axial direction of the cam mechanism, one operating mode switch means 180a being configured to change the attitude of the first cams 140a, and another operating mode switch means 180b being configured to change the attitude of the second cams 140b. The cam clutch with such a configuration can switch among four operating modes, two-way lock mode, forward direction lock mode, reverse direction lock mode, and two-way free mode.

One operating mode switch means and the other operating mode switch means may either have the same configuration, or different configurations. That is, in a case where one operating mode switch means is configured to move the cam attitude change part circumferentially, for example, the other operating mode switch means may either be configured to move the cam attitude change part circumferentially, or radially or axially. The same applies to cases where one operating mode switch means is configured to move the cam attitude change part radially or axially.

REFERENCE SIGNS LIST

100 Cam clutch
110 Inner race
115 Position restricting part
120 Outer race
121 Recessed groove
125 Position restricting part
130 Cam mechanism
135 Garter spring
136 Plate spring
140 Cam
140a First cam
140b Second cam 141 Head part
142 Radially outer engagement surface
143 Leg part
144 Radially inner engagement surface
145 Strut part
146 Garter spring mount groove
150 Cam cage
151 Annular plate
152 Annular plate
153 Notch
155 Columnar part
156 Groove
157 Garter spring mount groove
158 Protruded portion
159 Connecting plate
160 Pocket
161 Stopper accommodating part
170 Cage rotation stopper
171 Annular plate part
172 Circumferential wall part
173 Stopper part
174 Engaging pawl
180 Operating mode switch means
180a First operation mode switch means
180b Second operation mode switch means
181 End wall part
182 Circumferential wall part
185 Tab member
190 Bearing member
Ap Load application point
Ep Distal contact point
Sp Load support point

The invention claimed is:

1. A cam clutch comprising: an inner race and an outer race that are coaxial and rotatable relative to each other; a plurality of cams circumferentially arranged at intervals between the inner race and the outer race; a biasing means biasing each of the plurality of cams so that each of the plurality of cams makes contact with the inner race and the outer race; and
an operating mode switch means including a cam attitude change part that is drivable independently of rotation of the inner race and the outer race to forcibly tilt the cams, wherein
a load support point is located radially between a load application point of the cam attitude change part on the cam and a distal contact point of the cam on a raceway that is one of the inner race and the outer race positioned on a radially distal side relative to the load application point, a radial distance between the load application point and the load support point being larger than a radial distance between the load support point and the distal contact point, and
the cams are tilted around the load support point as a center of rotation when the cam attitude change part moves.

2. The cam clutch according to claim 1, further comprising a position restricting part that restricts a circumferential position and an attitude of each of the plurality of cams.

3. The cam clutch according to claim 2, wherein the position restricting part is formed on a raceway positioned on a radially distal side relative to the load application point.

4. The cam clutch according to claim 1, wherein the plurality of cams include a first cam and a second cam imparted with a moment in different directions by the biasing means,
the operating mode switch means being configured to be able to change an attitude of the first cam and an attitude of the second cam independently.

5. The cam clutch according to claim 4, further comprising a first operating mode switch means that changes the attitude of the first cam and a second operating mode switch means that changes the attitude of the second cam.

* * * * *